Dec. 13, 1966 R. W. BAINS ET AL 3,291,408

TAPE TRANSPORT MECHANISM

Filed July 10, 1963 3 Sheets-Sheet 1

INVENTORS
Robert W. Bains
John E. Whatley

BY Adolph C. Hugin
ATTORNEY

INVENTORS
Robert W. Bains
John E. Whatley
BY
Adolph C. Hugin
ATTORNEY

INVENTORS
Robert W. Bains
John E. Whatley
BY Adolph C. Hugin
ATTORNEY

United States Patent Office 3,291,408

Patented Dec. 13, 1966

3,291,408

TAPE TRANSPORT MECHANISM

Robert W. Bains and John E. Whatley, Shreveport, La., assignors to United Gas Corporation, a corporation of Delaware Filed July 10, 1963, Ser. No. 293,956
1 Claim. (Cl. 242—55.12)

This invention relates to tape or web winding and reeling systems and more particularly to a tape transport mechanism which is especially useful in the driving and control of magnetic tape in connection with computers and computer auxiliaries.

Magnetic tape has been used as a memory device in connection with various types of recorders and computers. In utilizing the information which is stored on such magnetic tape it is often desirable to start and stop the tape while other functions are being performed by the equipment which is utilizing the information. Such equipment may comprise computers which operate at very high speeds and, in order to achieve maximum efficiency, it is desirable to minimize delay in the starting and stopping of the tape, so that the information may be provided to the computer from the tape as rapidly as possible after a signal is received indicating the readiness of the computer for the reception of additional information or for a cessation of the delivery of information from the memory under predetermined conditions. It thus is desirable to bring the tape to full operating speed as near as possible to instantaneous and similarly to stop the tape substantially instantaneously. In order to minimize the inertia effects of the tape driving mechanism, it is therefore desirable to maintain as much of the tape drive at full driving speed at all times and to provide an arrangement for stopping the tape substantially instantaneously and driving it to full speed as rapidly as possible. The present invention was made especially to attain the foregoing improved results with a magnetic tape recorder such as the recorder sold commercially as the "Magnecord PT6," described in detail in a booklet entitled "Service—Instruction Manual the PT6–6 series," Howard W. Sams & Co. Inc., copyright registered 1958, with which this invention is especially adapted to being used and on which it is an improvement.

An object of the present invention is to provide an improved tape transport mechanism for substantially instantaneously stopping movement of the tape and providing for driving the tape to full speed as rapidly as possible.

Another object of the present invention is to provide an improved tape transport having independent means for substantially instantaneously stopping movement of a tape drive and providing for driving the tape from standstill to substantially full speed as quickly as possible.

A further object of the present invention is to provide an improved tape transport mechanism with a motor driven capstan and a tape pressure roll for biasing the tape into driving engagement with the capstan and having a brake for independently stopping a tape-up reel drive and concurrently moving the pressure roll away from the capstan so as to remove the driving engagement of the tape with the capstan.

Further objects and advantages of this invention will become apparent from the following description referring to the accompanying drawings, and the features of novelty which characterize this invention will be pointed out with particularity in the claim appended to and forming a part of this specification.

In carrying out the present invention a tape transport is provided wherein tape is adapted to be passed over a magnetic read head and to be drawn from a supply reel across the read head to a take-up reel by a motor driven capstan. In order to assure a substantially constant speed of operation of the tape across the read head, a pressure roll is provided which is resiliently biased toward the capstan so as to assure a substantially constant pressure of the magnetic tape in its driving engagement with the capstan. The tape take-up reel is rotatably mounted in a position such that the magnetic tape would extend from the read head to the take-up reel out of contact with the drive capstan and the pressure roll is movably mounted and resiliently biased toward engagement with the capstan so as to press the tape into frictional driving engagement with the capstan, thus assuring a substantially constant driving friction between the tape and the capstan. This provides for a substantially constant speed of operation of the tape across the read head. In order to improve the speed of starting and stopping of the tape, a brake is provided for concurrently stopping the take-up reel drive and moving the pressure roll away from the capstan, thereby permitting the magnetic tape to disengage its contact with the capstan, thus stopping its drive, and alternatively concurrently disengaging the brake from the take-up reel drive and moving the pressure roll toward the capstan and biasing the magnetic tape into driving engagement therewith. In this manner, the heavier driving parts of the tape transport comprising the major portion of its inertia, such as the motor and capstan drive, are kept in operation at the desired speed and only the tape and its relatively small inertial take-up reel mechanism is started and stopped when the tape is respectively started and stopped.

Figure 1:
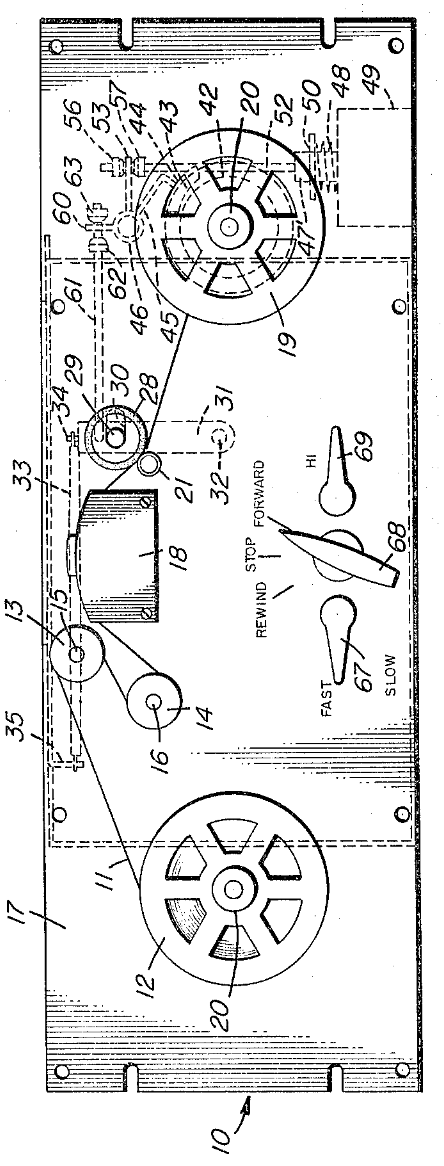
FIG. 1 is a side elevational view of the front panel of a magnetic tape reading device illustrating a tape transport mechanism constructed in accordance with an embodiment of the present invention.
Figure 2:
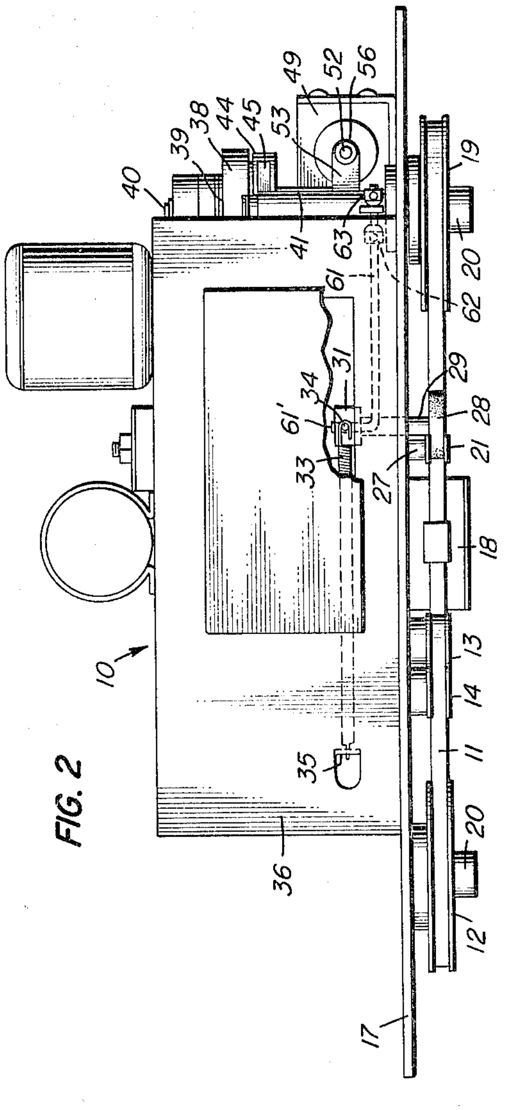
FIG. 2 is a plan view of the device illustrated in FIG. 1, partly broken away in order to show more clearly the connection of the pressure roll mounting.
Figure 4:
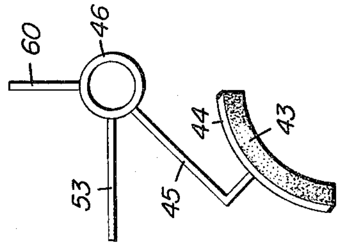
FIG. 4 is an end view of the member which actuates the brake and the pressure roll shown in FIGS. 1, 2, and 3.

Referring to the drawings, an embodiment of the present invention is illustrated applied to a magnetic tape reading device 10, such as an interpreter adapted to read a coded record and interpret it into signals which can be received and used by a computer. The illustrated tape 11 containing the record may be of any suitable type and is shown as extending from a supply reel 12 around a pair of guide rollers 13 and 14 rotatably mounted on stub shafts 15 and 16 supported on a front panel 17 of a housing for the interpreter. The tape passes from the guide rollers over a suitable read head 18, such as a conventional plural channel magnetic type, and to a take-up reel 19. Both the supply and take-up reels are rotatably mounted and are held in position by suitable retainers 20.

According to the present invention, provision is made for assuring a positive frictional drive of the tape at a predetermined speed and for a rapid positive stoppage of the tape. The present arrangement also provides accelerating both of the above conditions by concurrently removing the drive from the tape and stopping the take-up reel and alternatively concurrently removing the brake from the take-up reel and applying a drive to the tape. Both of these actions may be performed while the tape driving means remains in full operation, thus further accelerating quick response of the tape drive.

These important aspects of the present invention include the provision of a tape driving capstan 21 which is mounted so as normally to be out of driving engagement with the tape 11 when the take-up reel is held stationary, that is, the tape 11 extends from the read head 18 to the take-up reel 19 out of control with the capstan 21. Rotation of the capstan may be provided by any suitable drive and is shown as including an alternating current drive motor 22 energized from a suitable source through a switch 23. The motor has a drive shaft 24 with which a suitable friction pulley or puck 25 is drivingly engaged, and in turn frictionally drivingly engages another pulley or puck 26, both of which pulleys are suitably rotatably mounted on the interpreter housing. The pulley 26 is drivingly mounted on a suitable shaft 27 and is adapted to transmit the drive from the motor 22 to the tape driving capstan 21 through the shaft 27 to which the capstan is operably connected. In this manner the capstan is adapted to be driven whenever the motor 22 is in operation.

In order to drive the tape 11 by the capstan 21, a pressure roll 28 is mounted on a shaft 29 for pressing the tape into frictional driving engagement with the capstan. The roll shaft 29 extends through a slot 30 in the front panel 17 and is rotatably supported on an arm 31 which is pivotally mounted in any suitable manner, as by a pivot pin 32 on the housing of the interpreter. A coil spring 33 is secured in any suitable manner, as to a tab 34 on the arm 31, so as resiliently to pivot the arm and bias the pressure roll 28 toward engagement with the capstan 21. The other end of the coil spring 33 may be suitably connected in any manner to a stationary part of the interpreter and is shown as being hooked through an opening in a downwardly extending tab 35 punched from a cover 36 of the interpreter housing. In this manner the tape 11 which extends from the read head 18 to the take-up reel 19 is pressed into engagement with the capstan 21 by the pressure roll 28 which exerts a substantially constant pressure on the tape thereby assuring a substantially constant driving friction between the tape 11 and the capstan 21 thereby to provide for a constant speed drive of the tape whenever it is in engagement with the capstan.

Figure 3:
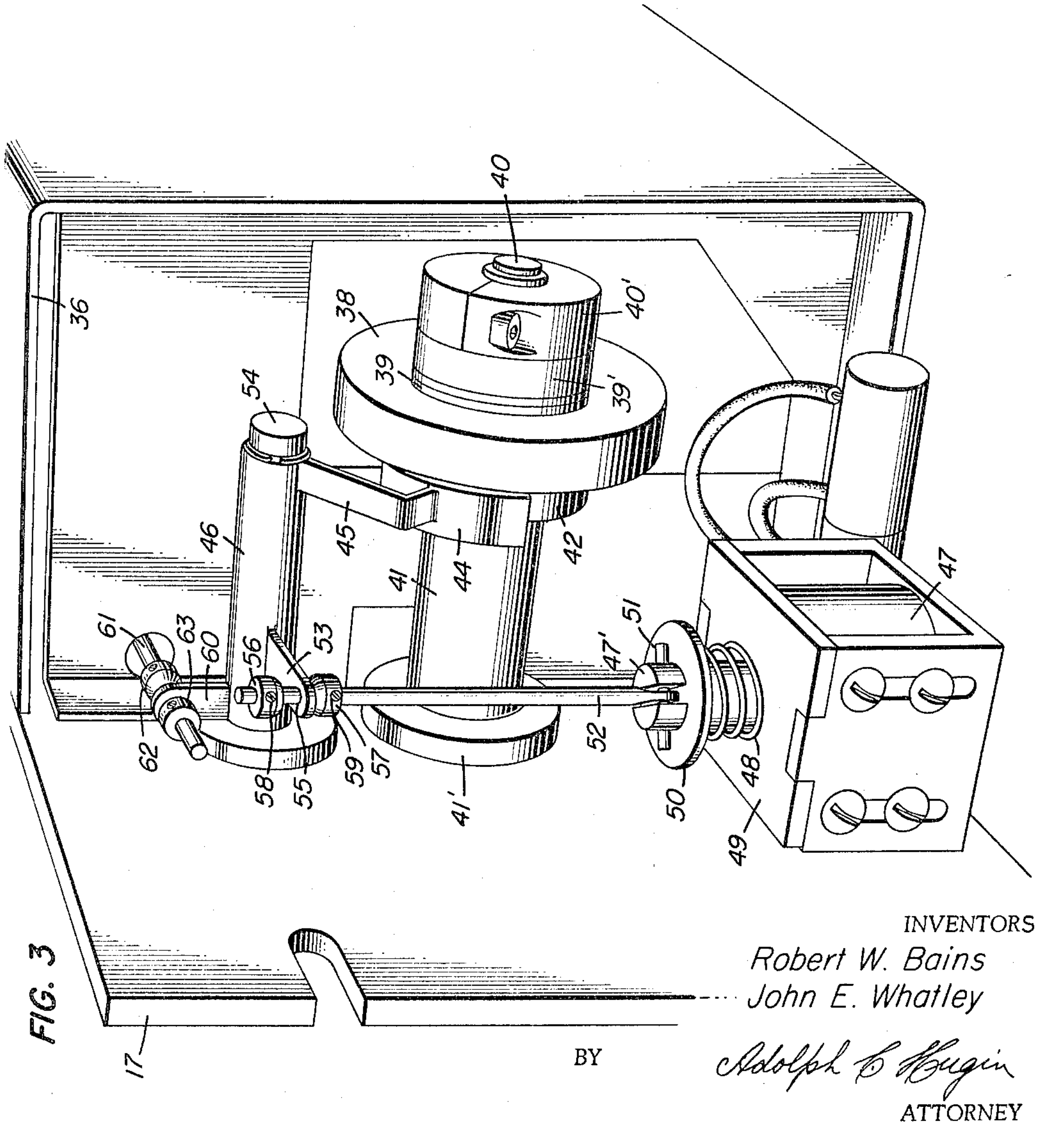
FIG. 3 is a fragmentary perspective view illustrating details of the mechanism for operating the improved tape transport shown in FIGS. 1 and 2.

Rapid positive stoppage of the tape is assured by providing a brake for stopping the take-up reel 19 and concurrently moving the pressure roll 28 away from the capstan 21, whereby the tape 11 assumes a position out of engagement with the capstan 21. This braking structure includes a mechanism for stopping the drive of the take-up reel. This take-up reel drive may comprise any suitable mechanism and is illustrated as including a friction pulley or puck 37 rotatably mounted in frictional driving engagement with the motor drive shaft 24 and also arranged in frictional driving engagement with a rotatable clutch plate 38. The clutch also includes a driven friction member 39 which is drivingly connected to a shaft 40 on which the take-up reel is mounted. A sleeve 41, having a flange 41' rigidly mounted in any suitable manner on the front panel 17, is provided with bearings therein rotatably supporting the take-up reel shaft 40, and an enlarged hub 42 is rigidly secured to and rotatable with the shaft 40 and may conveniently serve as a brake drum for the take-up reel. As shown in FIG. 3, the clutch parts 38 and 39 and the take-up reel shaft parts 40 and 42 all actually rotate in the same direction, whereas in the schematic illustration in FIG. 5 the clutch parts 38 and 39, for simplicity in illustrating the drive, appear to rotate in opposite directions.

The brake mechanism comprises a brake shoe 43 which is mounted on a backing plate 44 rigidly secured to an operating arm 45 integrally secured to an actuating sleeve member 46. The brake shoe is adapted to engage the brake drum 42 by rotation of the actuating sleeve 46, which rotation is controlled in any suitable manner, as by an electromagnetic solenoid 47 resiliently biased in any suitable manner as by a spring 48. This spring 48 may be conveniently seated on a frame structure 49 of the solenoid 47 and press against a spring seat washer 50, which engages a pivotal connecting pin 51 adapted to transmit the actuating force of the solenoid 47 and the bias of the spring 48 to the end of an operating rod 52 through which the connecting pin 51 extends so as to connect the rod 52 to a split end of the solenoid core 47'.

Actuation of the brake sleeve member 46 by the solenoid 47 is provided by a limited lost-motion connection formed between the end of the operating rod 52 and an actuating arm 53 formed integral with and extending outwardly from the sleeve 46. This sleeve 46 is rotatably mounted for a limited amount of oscillatory movement by a suitable stub shaft extending through the sleeve 46 and having a retaining head 54 formed on one end thereof and suitably rigidly secured to the front panel 17, as by threaded engagement therewith. The operating rod 52 extends through an opening 55 formed in the actuating arm 53 and has a sliding fit therein. A pair of stops 56 and 57 are secured to the operating rod 52 in any suitable manner, as by set screws 58 and 59 which retain the stops in a predetermined spaced apart relationship on opposite sides of the actuating arm 53. In this manner the coil spring presses against the spring seat washer 50, which transmits the force of the spring through the connecting pin 51 to the end of the operating rod 52 and through the rod to the stop 57 so as resiliently to bias the actuating arm 53 of the brake supporting sleeve 46 upwardly. This tends to raise the brake operating arm 45 and thereby to lift the brake shoe 43 out of engagement with the brake drum 42.

The operating sleeve 46 is formed with another operating arm 60 which extends outwardly therefrom and, in the illustrated embodiment, is substantially at right angles to the actuating arm 53. This operating arm 60 is adapted to draw the pressure roll 28 away from engagement with the capstan 21 when the brake shoe 43 is actuated into braking position in engagement with the brake drum 42. This may be done by suitably connecting the operating arm 60 to the pressure roll supporting arm 31 and, in the illustrated embodiment, includes an operating rod 61 which slidably extends through an opening in the operating arm 60 and is provided with a pair of stops 62 and 63 secured in predetermined spaced apart relationship, one on each side of the operating arm 60. As is more clearly shown in FIGS. 1 and 3, the stops 56, 57, 62, and 63 preferably are formed with rounded faces on the sides thereof adjacent to the arms 53 and 60 so as to minimize the friction between these parts. The other end of the operating rod 61 is pivotally connected to the pressure roll supporting arm 31 in any suitable manner, as by having the end 61' thereof bent into pivotal engagement with a complementary opening in the end of the pressure roll supporting arm 31.

Figure 5:
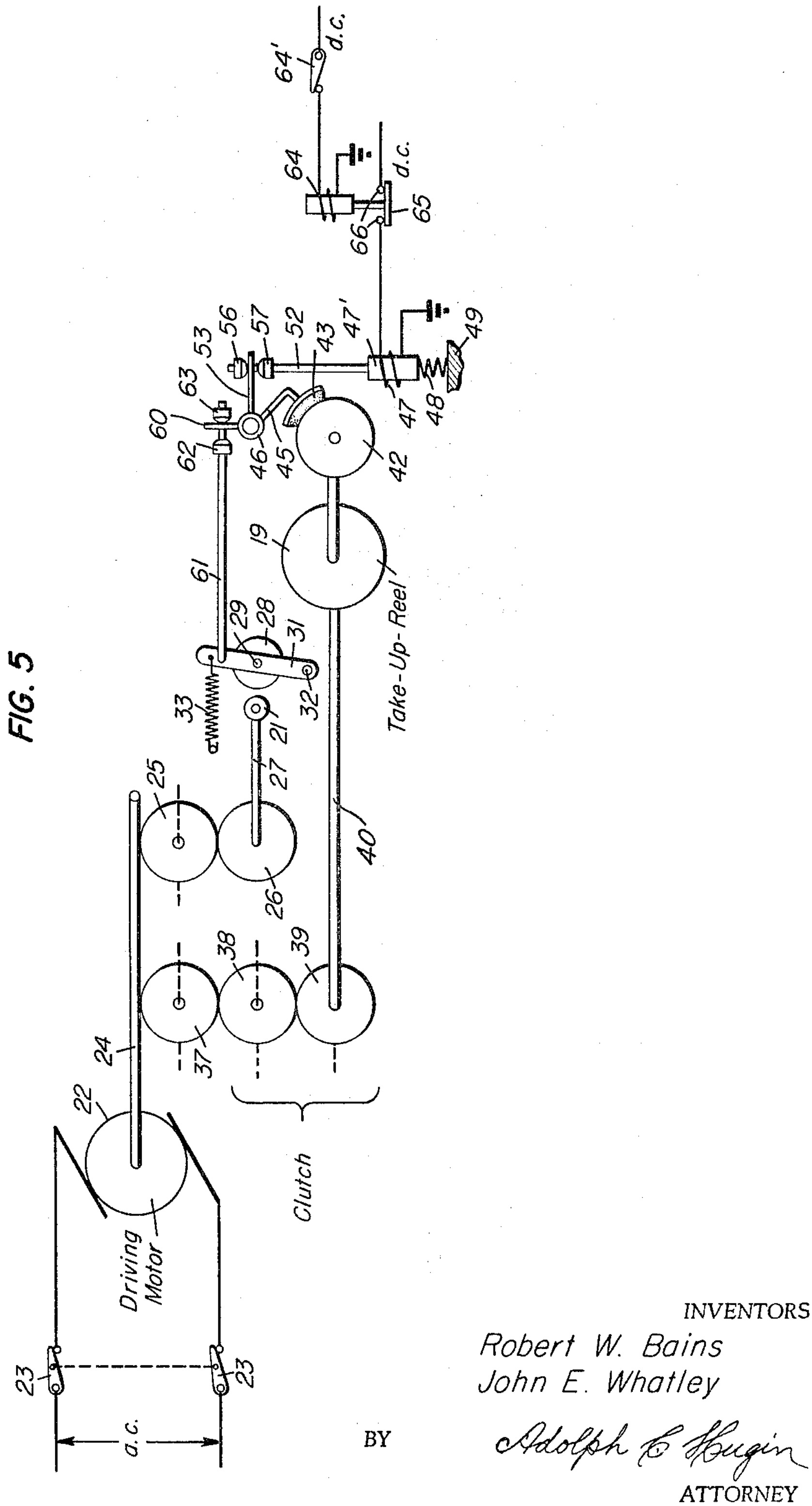
FIG. 5 is a schematic view of the basic driving and braking elements which may be utilized in the embodiment of the present invention shown in FIGS. 1–4.

In most instances, it will be found preferable to provide for independently controlling the concurrent actuation of the brake and pressure roll from the operation of the tape driving capstan. As is schematically shown in FIG. 5, this may be provided in any suitable manner, as by a relay 64 adapted to be energized from any suitable direct current electrical source through a suitable switch 64'. The relay 64 is provided with a contactor 65 which is adapted to close and open an electrical circuit through contacts 66, so as respectively to energize and deenergize the operating solenoid 47. Energization of the relay 64 may be provided in any suitable manner and may be obtained by manually closing the switch 64' to a suitable source of electrical power or may be obtained by response to a predetermined electrical characteristic of the system in which the interpreter is used. In some instances, such a signal may be given by a computer with which the interpreter is being operated so as to provide for automatic starting and stopping of the tape in response to predetermined operating requirements of the computer. Details of such control do not form part of the present invention and, therefore, are not illustrated in the drawings. In some instances, the control of the solenoid by the relay 64 may be directly related to the operation of the driving motor 22; however, in most instances, it will be found desirable to have an independent control so that the capstan 21 may be continuously driven while the tape 11 is started and stopped in response to the control provided by the solenoid 47.

By maintaining the tape driving capstan 21 continuously in rotation for normal operation, the tape can be placed into almost instantaneous forward drive by simple deenergization of the solenoid 47. This permits the spring 48 to bias the spring seat washer 50 upwardly and correspondingly to move the operating rod 52 upwardly, so that the stop 57 engages the under side of the actuating arm 53 and moves the stop 56 away from the upper side of this arm. When this occurs, the coil spring 33 draws the pressure roll supporting arm 31 toward the stationary tab 35. This moves the operating rod 61 so that the outer stop 63 on this rod engages the operating arm 60 and turns the brake operating sleeve 46 so as to raise the brake shoe 43 out of engagement with the brake drum 42, thus releasing the take-up reel 19. This permits the take-up reel 19 to be driven by the driving motor 22 through the clutch members 38 and 39 and the friction pulley 37. Concurrently with the disengagement of the brake, the pressure roll 28, which is carried by the arm 31, is moved toward the capstan 21 into engagement with the tape 11 so as to press the tape 11 into frictional driving engagement with the capstan 21. Since the capstan 21 is continuously in rotation, it will immediately start driving the tape 11 at a predtermined speed and the take-up reel 19 will wind up the tape 11 as it is drawn over the read head 18 by the capstan 21. The clutch elements 38 and 39 and the friction pulley 37 are such as to allow a limited amount of slippage in the drive of the take-up reel so that it does not exert an undue tension on the tape 11 and yet maintains it under sufficient tension to prevent the formation of slack between the driving capstan 21 and the take-up reel 19. Adjustment of this slippage can conveniently be provided by tightening or loosening the adjusting plate 40' which presses a resilient rubber washer 39' against clutch member 39.

The entire operation of the interpreter may be suitably controlled by switches 67, 68, and 69 mounted on the front panel of the interpreter housing. These switches do not form part of the present invention and, therefore, are not illustrated as connected in the schematic diagram of FIG. 5, but may be suitably connected in the circuits of the switches 23 and 64'. The switch 68 is shown in FIG. 1 in the "Forward" position which is the operating condition of the system illustrated schematically in FIG. 5.

While a particular embodiment of this invention has been illustrated and described, modifications thereof will occur to those skilled in the art. It is to be understood, therefore, that this invention is not to be limited to the particular details disclosed, and it is intended in the appended claim to cover all modifications within the spirit and scope of this invention.

What is claimed is:

A tape transport for a magnetic tape recorder having a recording head comprising: a tape driving capstan mounted on one side of the recording head, means including an electric motor for driving said capstan, a pressure roll, means rotatably mounting said pressure roll and supporting said roll movable toward and away from said capstan, means for resiliently biasing said pressure roll toward engagement with said capstan for increasing the driving friction of tape with said capstan, a tape take-up reel drive mounted on the same side of said recording head as said capstan for driving a take-up reel concurrently with the driving of said capstan and including a slip clutch having drive and driven parts for continuously exerting a driving torque on the take-up reel during the driving of said capstan by said capstan driving means and having a brake drum, a brake shoe, an actuating sleeve having an actuating arm and a pair of operating arms extending outwardly from said sleeve, means for rotatably mounting said actuating sleeve on the same side of said recording head as said capstan, means operably connecting said brake shoe to one of said operating arms and supporting it for operably engaging said brake drum, means operably connecting said pressure roll supporting means to the other of said operating arms, electromagnetic actuating means connected to said sleeve actuating arm for rotatably turning said sleeve to apply said brake shoe into braking engagement with said brake drum and concurrently to move said pressure roll away from said capstan and alternatively concurrently to disengage said brake shoe from said brake drum and to move said pressure roll toward said capstan whereby said take-up reel driving torque immediately effects take-up of tape when it is driven by said capstan and maintains it taut at all times, and means for independently controlling the energizing of said electromagnetic brake-actuating means and said motor.

References Cited by the Examiner

UNITED STATES PATENTS

| | | | |
|---|---|---|---|
| 2,845,230 | 7/1958 | Rhoades | 242—55.12 |
| 2,937,817 | 5/1960 | Loewe et al. | 242—55.12 |
| 3,078,057 | 2/1963 | Namenyi-Katz | 242—55.12 |

FOREIGN PATENTS

| | | |
|---|---|---|
| 810,674 | 3/1959 | Great Britain. |

FRANK J. COHEN, *Primary Examiner.*

GEORGE F. MAUTZ, *Examiner.*